United States Patent
Koshelev et al.

(10) Patent No.: US 11,555,960 B1
(45) Date of Patent: Jan. 17, 2023

(54) WAVEGUIDE ARRAY ILLUMINATOR WITH LIGHT SCATTERING MITIGATION

(71) Applicant: Facebook Technologies, LLC, Menlo Park, CA (US)

(72) Inventors: Alexander Koshelev, Redmond, WA (US); Giuseppe Calafiore, Redmond, WA (US)

(73) Assignee: Meta Platforms Technologies LLC, Menlo Park, CA (US)

(*) Notice: Subject to any disclaimer, the term of this patent is extended or adjusted under 35 U.S.C. 154(b) by 0 days.

(21) Appl. No.: 17/486,383

(22) Filed: Sep. 27, 2021

Related U.S. Application Data

(60) Provisional application No. 63/222,224, filed on Jul. 15, 2021.

(51) Int. Cl.
*G02B 6/124* (2006.01)
*G02B 6/28* (2006.01)
(Continued)

(52) U.S. Cl.
CPC ........... *G02B 6/124* (2013.01); *G02B 6/0036* (2013.01); *G02B 6/0061* (2013.01);
(Continued)

(58) Field of Classification Search
CPC ........ G02B 5/18; G02B 5/181; G02B 5/1814; G02B 5/1857; G02B 6/0036; G02B 6/0061; G02B 6/24; G02B 6/34; G02B 2006/12107; G02B 27/0944; G02B 27/4205; G02B 27/4272; G02B 27/4233
(Continued)

(56) References Cited

U.S. PATENT DOCUMENTS 5,911,018 A 6/1999 Bischel et al.
6,201,913 B1 3/2001 Yi et al.
(Continued)

FOREIGN PATENT DOCUMENTS

CN 106405450 A * 2/2017 ............... B81B 7/02
EP 3819688 A1 5/2021
(Continued)

OTHER PUBLICATIONS

Teng S., et al., "Uniform Theory of the Talbot Effect with Partially Coherent Light Illumination," Journal of the Optical Society of America. A, Optics, image science, and vision, Sep. 2003, vol. 20, No. 9, pp. 1747-1754.
(Continued)

*Primary Examiner* — Keith G. Delahoussaye
(74) *Attorney, Agent, or Firm* — Pequignot + Myers; Matthew A. Pequignot

(57) ABSTRACT

A waveguide illuminator includes an input waveguide, a waveguide splitter coupled to the input waveguide, and a waveguide array coupled to the waveguide splitter. The waveguide array includes an array of out-coupling gratings that out-couple portions of the split light beam to form an array of out-coupled beam portions for illuminating a display panel. The out-coupling gratings may be apodized to reduce light scattering by the gratings. Additionally, gaps between the out-coupling gratings along the waveguides may be filled by gap gratings and/or etched grooves running parallel to the waveguides.

20 Claims, 9 Drawing Sheets

(51) Int. Cl.
  *G02B 6/12* (2006.01)
  *G02B 6/125* (2006.01)
  *G02B 27/09* (2006.01)
  *G02B 27/10* (2006.01)
  *G02B 6/34* (2006.01)
  *G02B 27/01* (2006.01)
  *F21V 8/00* (2006.01)

(52) U.S. Cl.
  CPC ....... *G02B 6/0066* (2013.01); *G02B 6/12004* (2013.01); *G02B 6/125* (2013.01); *G02B 6/12007* (2013.01); *G02B 6/2804* (2013.01); *G02B 27/0944* (2013.01); *G02B 27/0994* (2013.01); *G02B 27/106* (2013.01); *G02B 6/34* (2013.01); *G02B 27/017* (2013.01)

(58) Field of Classification Search
  USPC .......................................................... 385/10
  See application file for complete search history.

(56) References Cited

U.S. PATENT DOCUMENTS

| | | | |
|---|---|---|---|
| 7,468,838 | B2 | 12/2008 | Cha et al. |
| 10,613,410 | B2 | 4/2020 | Hosseini et al. |
| 10,684,404 | B2 | 6/2020 | Fattal |
| 2005/0089277 | A1 | 4/2005 | Ishida |
| 2011/0274438 | A1* | 11/2011 | Fiorentino ............... G02B 6/34 398/187 |
| 2013/0155477 | A1 | 6/2013 | Yankov et al. |
| 2014/0314374 | A1* | 10/2014 | Fattal ................... G02B 5/1861 385/33 |
| 2017/0090096 | A1* | 3/2017 | Fattal ................... G02B 6/0018 |
| 2017/0139110 | A1 | 5/2017 | Woodgate et al. |
| 2017/0299793 | A1 | 10/2017 | Fattal |
| 2018/0107091 | A1 | 4/2018 | Hosseini et al. |
| 2018/0113419 | A1 | 4/2018 | Stafford |
| 2018/0152680 | A1 | 5/2018 | Zimmerman et al. |
| 2019/0155105 | A1* | 5/2019 | Aieta .................... G02B 30/33 |
| 2020/0271850 | A1 | 8/2020 | Vora et al. |
| 2022/0236486 | A1* | 7/2022 | Muñoz Muñoz .... G02B 6/2804 |

FOREIGN PATENT DOCUMENTS

| | | |
|---|---|---|
| WO | 2020041067 A1 | 2/2020 |
| WO | 2022120250 A1 | 6/2022 |
| WO | 2022120253 A1 | 6/2022 |

OTHER PUBLICATIONS

International Search Report and Written Opinion for International Application No. PCT/US2022/036058, dated Nov. 9, 2022, 12 pages.

International Search report and Written Opinion for International Application No. PCT/US2022/037012, dated Nov. 15, 2022, 11 pages.

International Search Report and Written Opinion for International Application No. PCT/US2022/036056, dated Sep. 8, 2022, 13 pages.

International Search report and Written Opinion for International Application No. PCT/US2022/036987, dated Oct. 19, 2022, 11 pages.

International Search Report and Written Opinion for International Application No. PCT/US2022/037357 dated Sep. 23, 2022, 11 pages.

* cited by examiner

US 11,555,960 B1

WAVEGUIDE ARRAY ILLUMINATOR WITH LIGHT SCATTERING MITIGATION

REFERENCE TO RELATED APPLICATION

This application claims priority from U.S. Provisional Patent Application No. 63/222,224 entitled "Single Mode Backlight Illuminator", filed on Jul. 15, 2021 and incorporated herein by reference in its entirety.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient light sources and illuminators providing illumination of a display panel, high-throughput ocular lenses and other optical elements in the image forming train.

BRIEF DESCRIPTION OF THE DRAWINGS

Exemplary embodiments will now be described in conjunction with the drawings, in which.

DETAILED DESCRIPTION

Figure 1:
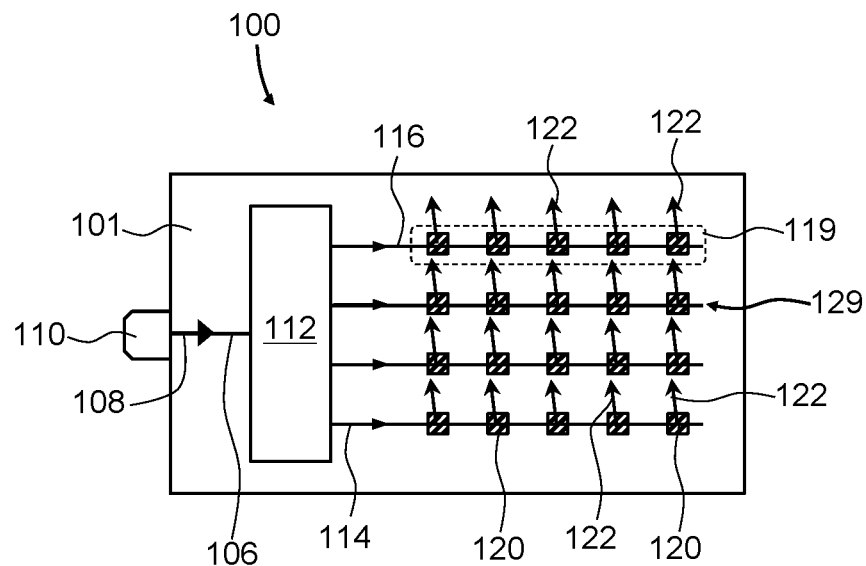
FIG. 1 is a schematic plan view of a waveguide illuminator of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 3 to 7, similar numbers refer to similar elements.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50% due to small pixel size. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors may considerably reduce the light utilization and overall wall plug efficiency of the display, which is undesirable.

In accordance with this disclosure, light utilization and wall plug efficiency of a backlit display may be improved by providing a waveguide illuminator including an array of out-couplers aligned with pixels of the display panel. In displays where the illuminator emits light of primary colors, e.g. red, green, and blue, the color of the illuminating light may be matched to the color filters, or the color filters may be omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to increase the useful portion of display light that is not absorbed or reflected by the display panel on its way to the eyes of the viewer, and consequently to improve the display's wall plug efficiency.

Singlemode or few-mode waveguides, e.g. ridge waveguides propagating light of up to several lateral propagation modes allow for efficient control of such light properties as color and directivity, especially in combination with laser illumination. Because light propagates in a single spatial mode, the output light can be diffraction-limited and highly directional. Single mode propagation also allows one to out-couple light in specific points on the waveguide, and even incorporate focusing pixels that can focus light into the pixels of a display panel while avoiding scattering in inter-pixel areas. The narrow spectrum of laser illumination enables large color gamut displays. Furthermore, single mode waveguides may preserve polarization, which results in highly polarized output from a backlight unit of a polarization-selective display, without the need of polarizer.

Singlemode or few-mode waveguides may use diffraction gratings to out-couple light in specific points of a ridge waveguide array. The gratings out-couple light by diffraction. A small percentage of light may also scatter, especially in the forward direction. The scattered light may undergo optical interference due to the coherent nature of the illuminating light. The optical interference may perturb the output illumination pattern. In accordance with this disclosure, the scattering by the diffraction grating out-couplers may be reduced by matching impedance of the gratings to that of inter-grating waveguide areas. The impedance may be matched by e.g. apodizing the gratings, etching inter-grating areas, filling the inter-grating areas with gratings structures, and by other methods as disclosed herein.

In accordance with the present disclosure, there is provided a waveguide illuminator comprising an input waveguide for guiding an input light beam in the input waveguide, a waveguide splitter coupled to the input waveguide for splitting the input light beam into a plurality of sub-beams, and a waveguide array coupled to the waveguide splitter for propagating the plurality of sub-beams in the waveguide array. Waveguides of the waveguide array run parallel to one another, each waveguide being configured to guide a sub-beam of the plurality of sub-beams. The waveguide illuminator further includes an array of out-coupling gratings comprising rows of out-coupling gratings. Each row is coupled to a corresponding waveguide of the waveguide array along a length of the waveguide. The out-coupling gratings of each row are configured for out-coupling portions of the sub-beam propagating in the corresponding waveguide, whereby in operation, a two-dimensional array of the sub-beam portions is out-coupled from the waveguide array.

The out-coupling gratings of each row of the array out-coupling gratings may have an out-coupling efficiency gradually increasing with distance from the waveguide splitter, for flattening a spatial distribution of optical power of the two-dimensional array of the out-coupled sub-beam portions. In some embodiments, out-coupling gratings of the array of out-coupling gratings are apodized in a direction of length of corresponding waveguides, such that at least one of the following conditions is fulfilled: a duty cycle of each out-coupling grating is less than 0.1 or greater than 0.9 at opposite ends of the out-coupling grating, and is greater than 0.1 and less than 0.9 between the opposite ends of the out-coupling grating; or a groove depth of each out-coupling grating is less at the opposite ends of the out-coupling grating than at the middle of the out-coupling grating.

In embodiments where the waveguide array comprises an array of ridge waveguides, the array of out-coupling gratings may be formed in the array of ridge waveguides. The out-coupling gratings of each row may include grooves etched in a corresponding ridge waveguide of the array of ridge waveguides to a grating etch depth $D_{GR}$. To balance the impedance, gaps between neighboring out-coupling gratings of each row may be uniformly etched to a gap etch depth $D_{GAP}=aD_{GR}$, where $0<a<1$, e.g. $a<0.5$. In some embodiments, out-coupling gratings of each row comprise grooves in a corresponding ridge waveguide of the array of ridge waveguides at a grating pitch $P_{GR}$. To balance the impedance, gaps between neighboring out-coupling gratings of each row may include gap gratings. The gap gratings may include grooves running non-parallel to the waveguides of the waveguide array at a gap pitch $P_{GAP}=bP_{GR}$, where $0<b<0.5$, or, in some embodiments, grooves running parallel to the waveguides of the waveguide array.

In accordance with the present disclosure, there is provided a display device comprising a waveguide illuminator of this disclosure and a display panel comprising an array of display pixels disposed and configured to receive the two-dimensional array of the out-coupled sub-beam portions. A pitch of the display pixels may be substantially equal to a pitch of the array of out-coupling gratings.

In some embodiments, the display device further includes a light source for providing the input light beam to the input waveguide. The light source may be e.g. a polarized light source providing a polarized input light beam and polarized out-coupled sub-beam portions. The light source may also be a monochromatic light source, where the input light beam has a wavelength of some color channel. The input light beam may include a plurality of color channels.

In accordance with the present disclosure, there is further provided a method for reducing light scattering in a waveguide illuminator as disclosed herein. The method comprises matching impedance of out-coupling gratings of a row of the out-coupling gratings to impedance of gaps between the out-coupling gratings of the row of the out-coupling gratings.

In some embodiments of the method, matching the impedance of the out-coupling gratings comprises apodizing out-coupling gratings of the array of out-coupling gratings in a direction of length of corresponding waveguides, such that a duty cycle of each out-coupling grating at opposite ends of the out-coupling grating is less than 0.1 or greater than 0.9, being between 0.1 and 0.9 between the opposite ends of the out-coupling grating.

In embodiments where the waveguide array comprises an array of ridge waveguides, and the array of out-coupling gratings is formed in the array of ridge waveguides by etching the ridge waveguides to a grating etch depth $D_{GR}$ as disclosed herein, matching impedance of the out-coupling gratings may include uniformly etching gaps between neighboring out-coupling gratings of each row a gap etch depth $D_{GAP}=a\,D_{GR}$, wherein $0<a<1$, and/or forming gap gratings in gaps between neighboring out-coupling gratings, at a pitch at least twice less than a pitch of the out-coupling gratings. The gap gratings may include grooves running parallel to the ridge waveguides of the array of ridge waveguides.

Referring now to FIG. 1, a waveguide illuminator 100 includes a substrate 101 supporting an input waveguide 106 for guiding an input light beam 108 provided by a light source 110, e.g. a laser source. Herein, the term "waveguide" denotes a light guiding structure that bounds the light propagation in two dimensions, like a light wire, and guides the light in a single transversal mode, or in several transversal modes, e.g. up to 12 modes of propagation. A waveguide may be straight, curved, etc. One example of a linear waveguide is a ridge-type waveguide. The waveguide illuminator 100 may be implemented in a photonic integrated circuit (PIC).

A waveguide splitter 112 is coupled to the input waveguide 106. The function of the waveguide splitter 112 is to split the input light beam 108 into a plurality of sub-beams 114. An array of waveguides 116 is coupled to the waveguide splitter 112 for guiding the sub-beams 114 in the waveguides 116 of the array. The waveguides 116 run parallel to one another as illustrated. Each waveguide 116 is configured to guide one of the sub-beams 114 from the waveguide splitter 112 to an end 129 of the waveguide 116.

An array of out-coupling gratings 120 is supported by the substrate 101 of the waveguide illuminator 100, or may be formed in the waveguides 116 themselves. Each row 119 of the out-coupling gratings 120 is coupled to a waveguide 116 of the waveguide array along a length of the waveguide 116, for out-coupling portions 122 of one of the sub-beams 114 propagating in the waveguide 116. The portions 122 out-coupled by all rows 119 of the out-coupling gratings 120 form a two-dimensional array of the sub-beam portions 122. The portions 122 are out-coupled from the waveguide array and exit the waveguide illuminator 100 at an angle, e.g. an acute or straight angle, to the substrate 101. The X- and Y-pitch of the out-coupling gratings 120 out-coupling the two-dimensional array of the sub-beam portions 122 may be selected to match X- and Y-pitch of a display panel to be illuminated by the waveguide illuminator 100, to make sure that each sub-beam portion 122 illuminates a specific pixel of the display panel, not shown.

Figure 2A:
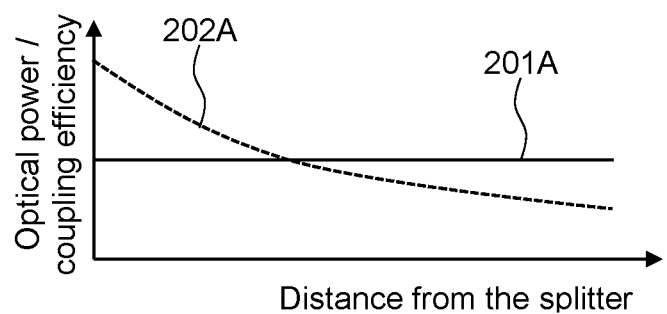
FIG. 2A is a combined plot of out-coupling efficiency and out-coupled optical power vs. distance the light traveled in waveguides of the illuminator of FIG. 1, for the case of spatially uniform out-coupling efficiency.

When out-coupling efficiency of all out-coupling gratings 120 is the same along any of the rows 119 as indicated by a straight solid line 201A in FIG. 2A, the out-coupled optical power of the sub-beam portions 122 exponentially reduces with distance from the waveguide splitter 112 as indicated by an exponential dashed line 202A. This happens because with each out-coupling, the sub-beam 114 loses power, and accordingly, a same out-coupled percentage of the lesser power results in a lesser out-coupled optical power of the next sub-beam portion 122.

Figure 2B:
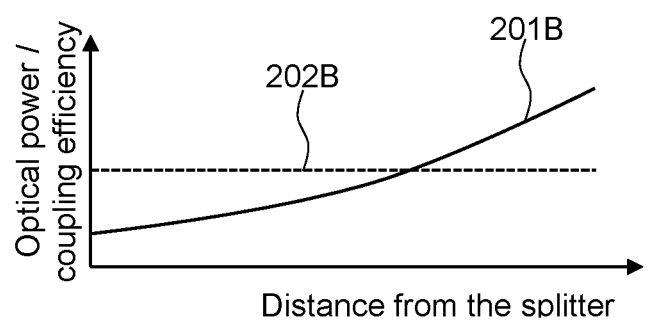
FIG. 2B is a combined plot of out-coupling efficiency and out-coupled optical power vs. distance the light traveled in waveguides of the illuminator of FIG. 1, for the case of spatially non-uniform out-coupling efficiency.

In many applications, it is desirable to have the optical power of all sub-beam portions 122 at a same level. To that end, the out-coupling gratings 120 of each row 119 of out-couplers may be made to have the out-coupling efficiency gradually increasing with distance from the waveguide splitter 112 as indicated in FIG. 2B by a curved solid line 201B, for evening out or flattening a spatial distribution of optical power of the two-dimensional array of out-coupled sub-beam portions 122, as indicated by a dashed straight line 202B.

The gradual increase of the out-coupling efficiency may be achieved in a number of ways, depending on the out-coupler type. By way of non-limiting examples, grating duty cycle, length, height, and/or width may be varied from grating to grating to achieve the spatial uniformity of optical power of the out-coupler sub-beam portions 122.

Figure 3:
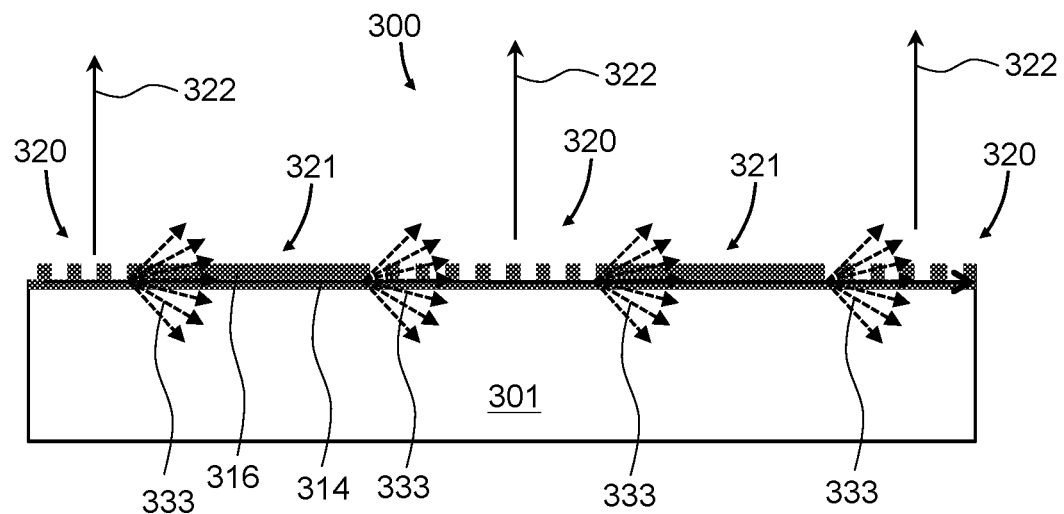
FIG. 3 is a side cross-sectional magnified view of a waveguide illuminator showing forward scattering by grating out-couplers of a waveguide illuminator of this disclosure.

Referring to FIG. 3, a waveguide illuminator 300 is an embodiment of the waveguide illuminator 100 of FIG. 1, and includes similar elements as the waveguide illuminator 100 of FIG. 1. Specifically, the waveguide illuminator 300 of FIG. 3 includes an array of waveguides 316 supported by a substrate 301. An array of out-coupling gratings 320 is coupled to the array of waveguides 316 for out-coupling a two-dimensional array of portions 322 of sub-beams 314, similarly to the waveguide illuminator 100 of FIG. 1. For brevity, FIG. 3 shows one of the waveguides 316 of the waveguide illuminator 300 and three out-coupling gratings 320 formed in the waveguide 316 and configured for out-coupling portions 322 of the sub-beam 314 propagating in the waveguide 316.

A portion of the energy of the sub-beam 322 is out-coupled as forward-scattered light 333. This happens because an impedance of the out-coupling gratings 320 is not matched to that of inter-grating areas or gaps 321, which are portions of the waveguide 316 between the out-coupling gratings 320. Such light scattering may be undesirable because the scattered light may undergo optical interference due to a coherent nature of the input light beam 108. The optical interference may distort the required pattern of out-coupled light points 122, causing undesired and unpredictable local optical power density variations.

The scattering illustrated in FIG. 3 may be reduced by matching the impedance of the out-coupling gratings 320 to the impedance of gaps 321 between the out-coupling gratings 320. The impedance matching may be achieved in a number of ways, as described in detail below.

Figure 4A:
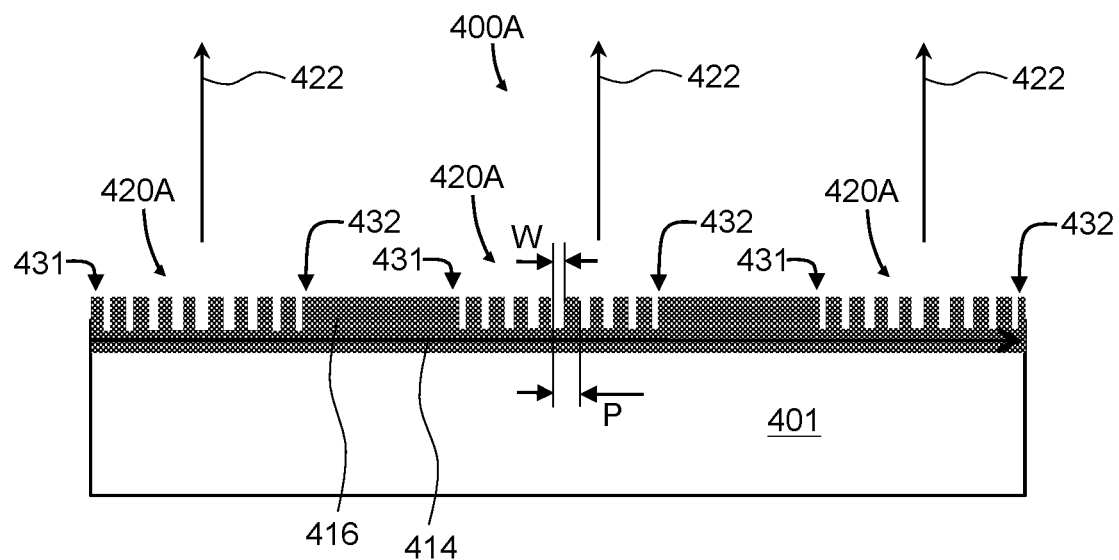
FIG. 4A is a side cross-sectional magnified view of a waveguide illuminator embodiment with apodized duty cycle of the grating out-couplers.

Referring first to FIG. 4A, a waveguide illuminator 400A is an embodiment of the waveguide illuminator 100 of FIG. 1, and includes similar elements as the waveguide illuminator 100. In particular, the waveguide illuminator 400A of FIG. 4A includes an array of waveguides 416, e.g. ridge waveguides, supported by a substrate 401. The array of waveguides 416 receives the sub-beams 414 from a splitter, such as e.g. the splitter 112 of the waveguide illuminator 100 of FIG. 1. An array of out-coupling gratings 420A (FIG. 4A) is coupled to an array of waveguides 416 for out-coupling a two-dimensional array of portions 422 of sub-beams 414, similarly to the waveguide illuminator 100 of FIG. 1. FIG. 4A shows a magnified view of one of the waveguides 416 and three out-coupling gratings 420A formed in the waveguide 416 and configured for out-coupling portions 422 of the sub-beam 414 propagating in the waveguide 416.

The out-coupling gratings 420A are apodized at opposed ends 431, 432 in a direction of length of the waveguide 416, i.e. along the waveguide 416 extending left to right in FIG. 4. The out-coupling gratings 420A are apodized in duty cycle. The duty cycle is defined as a ratio of a width W of a gratings groove or fringe to a pitch P of the grating. For example, the duty cycle of each out-coupling grating 420A may be less than 0.1 or greater than 0.9 at the opposite ends 431, 432 of the out-coupling gratings 420A, and may be greater than 0.1 and less than 0.9 between the opposite ends 431, 432 of the out-coupling gratings 420A.

Figure 4B:
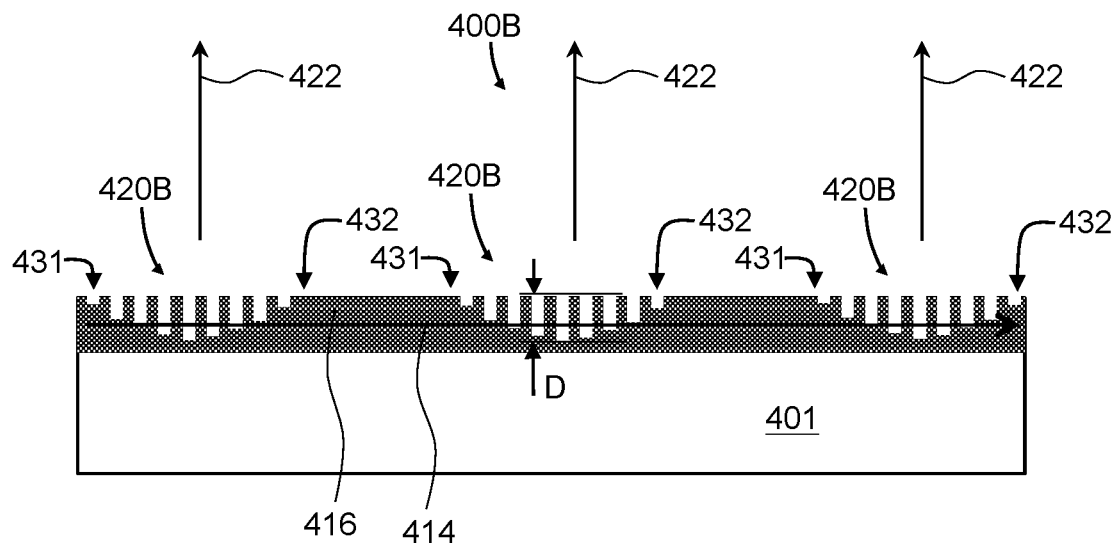
FIG. 4B is a side cross-sectional magnified view of a waveguide illuminator embodiment with apodized grating depth of the grating out-couplers.

Turning to FIG. 4B, a waveguide illuminator 400B is similar to the waveguide illuminator 400A of FIG. 4A. The difference between the waveguide illuminator 400B of FIG. 4B and the waveguide illuminator 400A of FIG. 4A is that in the waveguide illuminator 400B of FIG. 4B, out-coupling gratings 420B are apodized in depth D, not duty cycle W/P. The depth D of the out-coupling gratings 420B varies along the corresponding waveguides 416, being minimal at the opposed ends 431, 432 of the out-coupling gratings 420B and being maximal close to the middle or at the middle of the out-coupling gratings 420B, as illustrated. In some embodiments, the out-coupling gratings may be apodized in both the depth D and the duty cycle W/P.

Figure 5:
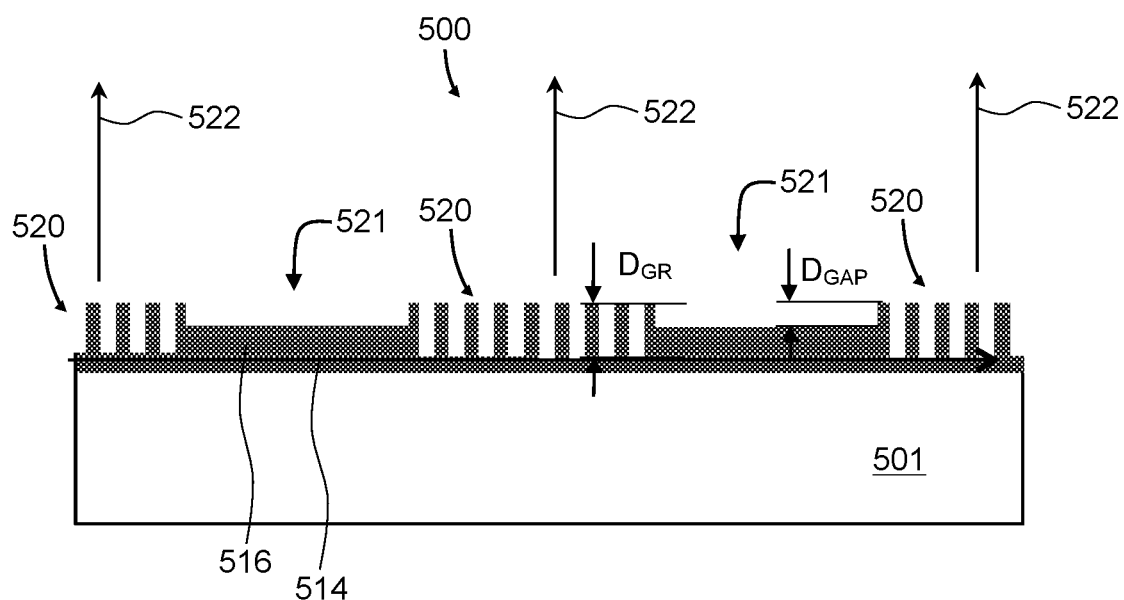
FIG. 5 is a side cross-sectional magnified view of a waveguide illuminator embodiment with etched gaps between grating out-couplers.

Referring to FIG. 5, a waveguide illuminator 500 is an embodiment of the waveguide illuminator 100 of FIG. 1, and includes similar elements as the waveguide illuminator 100. In particular, the waveguide illuminator 500 of FIG. 5 includes an array of waveguides 516, e.g. ridge waveguides, on a substrate 501. The array of waveguides 516 receives the sub-beams 516 from a splitter, such as the splitter 112 of the waveguide illuminator 100 of FIG. 1. An array of out-coupling gratings 520 (FIG. 5) is coupled to an array of waveguides 516 for out-coupling a two-dimensional array of portions 522 of sub-beams 514, similarly to the waveguide illuminator 100 of FIG. 1. FIG. 5 shows a magnified view of one of the waveguides 516 and three out-coupling gratings 520 of a row of the coupling gratings 520 formed in the waveguide 516 and configured for out-coupling portions 522 of the sub-beam 514 propagating in the waveguide 516.

The out-coupling gratings 520 of each row comprise grooves etched in the corresponding ridge waveguide 516 of the array of ridge waveguides to a grating etch depth $D_{GR}$. Gaps 521 between neighboring out-coupling gratings 520 of each row may be uniformly etched to a gap etch depth $D_{GAP}=aD_{GR}$, where 0<a<1. In other words, the gaps 521 are uniformly etched to the depth $D_{GAP}$ less than the depth $D_{GR}$ of the grooves of the out-coupling gratings. The etch depth $D_{GAP}$ of the gaps 521 depends on the duty cycle of the out-coupling gratings 520, and may be selected so as to match the impedance of the gaps to that of the out-coupling gratings 520, thereby reducing forward scattering of the sub-beams 514. In some embodiments, the parameter a<0.5, i.e. the gap etch depth $D_{GAP}$ is less than a half of the grating etch depth $D_{GR}$.

Figure 6A:
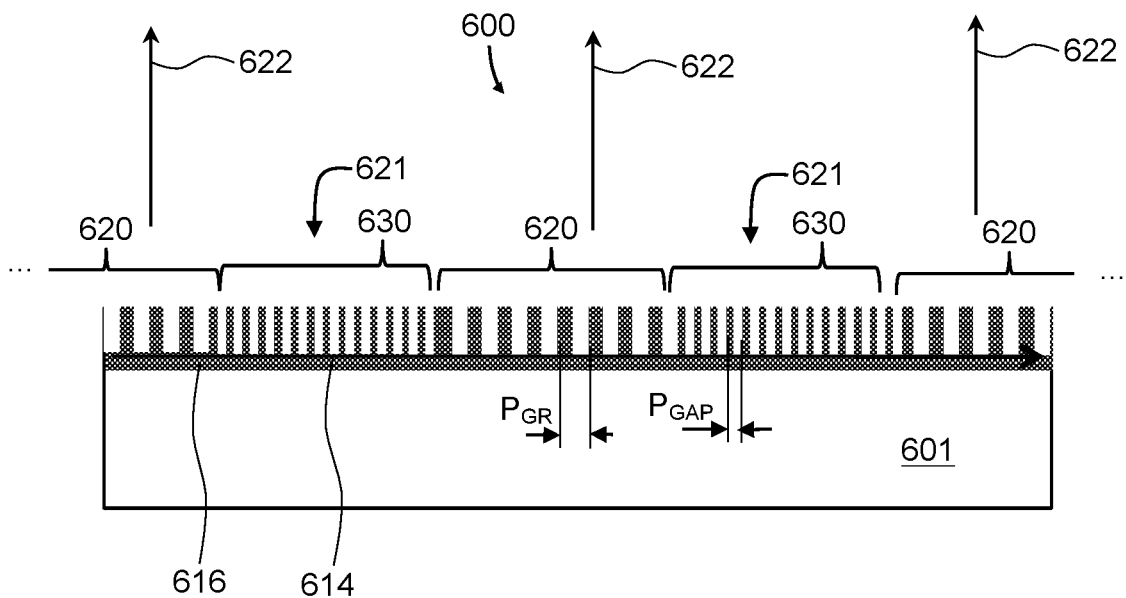
FIG. 6A is a side cross-sectional magnified view of a waveguide illuminator embodiment with gap gratings formed in between grating out-couplers.

Turning to FIG. 6A, a waveguide illuminator 600 is an embodiment of the waveguide illuminator 100 of FIG. 1, and includes similar elements. In particular, the waveguide illuminator 600 of FIG. 6 includes an array of waveguides 616, e.g. ridge waveguides, on a substrate 601. The array of waveguides 616 receives the sub-beams 616 from a splitter, such as the splitter 112 of the waveguide illuminator 100 of FIG. 1. An array of out-coupling gratings 620 (FIG. 6A) is formed in an array of waveguides 616 for out-coupling a two-dimensional array of portions 622 of sub-beams 614, similarly to the waveguide illuminator 100 of FIG. 1. FIG. 6A shows a magnified view of one of the waveguides 616 and three out-coupling gratings 620 of a row of the coupling gratings 620 formed in the waveguide 616 and configured for out-coupling portions 622 of the sub-beam 614 propagating in the waveguide 616.

Figure 6B:
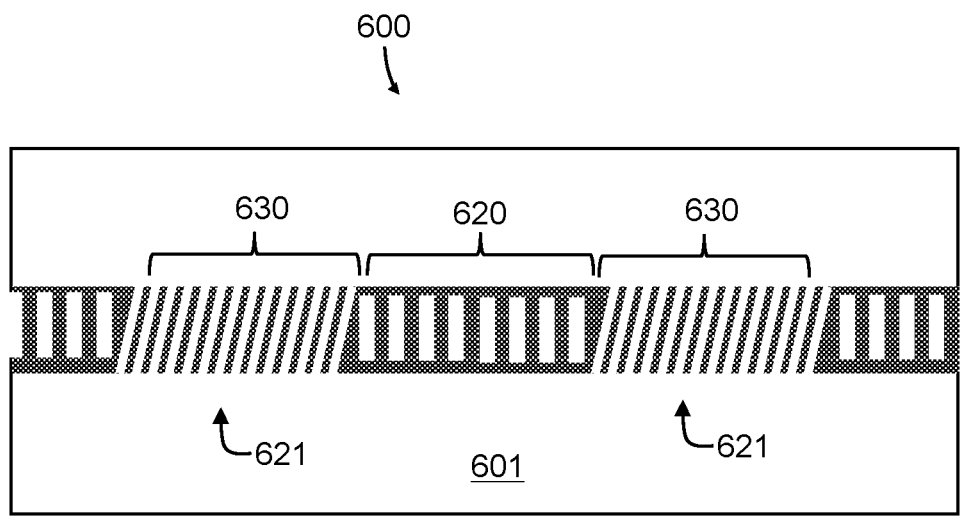
FIG. 6B is a top view of the waveguide illuminator of FIG. 6A.

The out-coupling gratings 620 of each row comprise grooves etched in the corresponding ridge waveguide 616 of the array of ridge waveguides. Gaps 621 between neighboring out-coupling gratings 620 of each row include gap gratings 630. The gap gratings 630 may have a pitch fine enough to prevent diffraction of the sub-beam portions 622. The purpose of the gap gratings 630 is to match the impedance of the gaps to that of the out-coupling gratings 620, thereby reducing forward scattering of the sub-beams 614. For example, a gap grating 630 pitch $P_{GAP}$ may be equal to $bP_{GR}$, where 0<b<0.5. In other words, the gap gratings 630 pitch may be less than one half of the pitch of the out-coupling gratings 620. FIG. 6B illustrates that the gap gratings 630 may have grooves angled w.r.t the out-coupling gratings 620. The grooves of the gap gratings 630 may run non-parallel to the waveguides 616 of the waveguide array.

Figure 7:
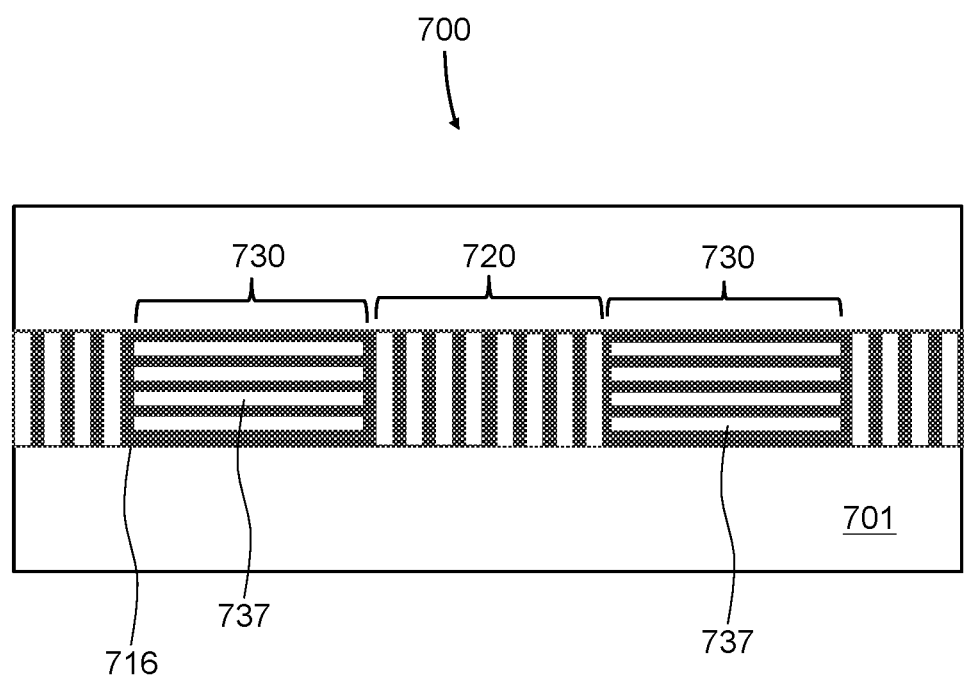
FIG. 7 is a side cross-sectional magnified view of a waveguide illuminator embodiment with waveguide-parallel gap gratings formed between grating out-couplers.

Referring to FIG. 7, a waveguide illuminator 700 is similar to the waveguide illuminator 600 of FIGS. 6A and 6B, and includes similar elements, such as array of waveguides 716 supported by the substrate 701, and an array of out-coupling gratings 720 coupled to the array of waveguides 716, e.g. formed in the waveguides 716. The difference between the waveguide illuminator 700 of FIG. 7 and the waveguide illuminator 600 of FIGS. 6A and 6B is that in the waveguide illuminator 700 of FIG. 7, gap grooves 737 of the gap gratings 730 run parallel to the waveguides 716. Such orientation of the gap grooves 737 ensures that no diffraction of light propagating in the waveguides 716 may occur on the gap gratings 730. The purpose of the gat gratings 730 is to reduce forward scattering.

Figure 8:
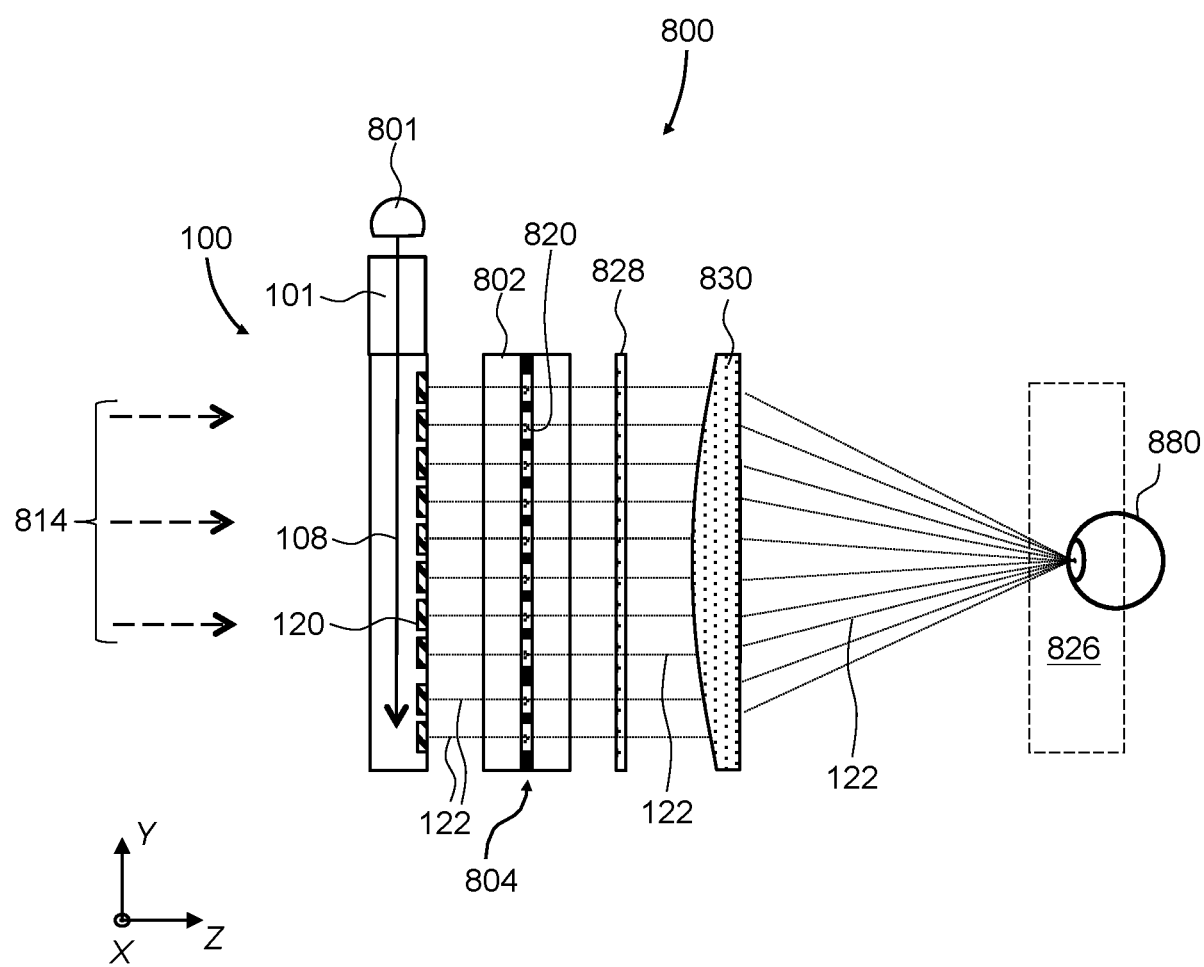
FIG. 8 is a schematic view of a near-eye display using a waveguide illuminator of this disclosure.

Referring now to FIG. 8 with further reference to FIG. 1, a display device 800 includes the waveguide illuminator 100 of FIG. 1, or any other waveguide illuminator disclosed herein, coupled to a display panel 802 (FIG. 8). A light source 801, e.g. a monochromatic light source at a wavelength of a color channel and/or a polarized light source, may be optically coupled to the illuminator 100 for providing the light beam 108 to the illuminator 100. The display panel 802 includes an array of display pixels 820 disposed and configured to receive the array of the out-coupled sub-beam portions 122 from the illuminator 100. To ensure that the sub-beam portions 122 are used efficiently, the pitch of the display pixels 820 may be matched to the pitch of the array of out-couplers 120, in both X- and Y-directions. For example, the pitch of the display pixels 820 may be equal to a pitch of the array of the out-couplers 120, enabling each sub-beam portion 122 to propagate through the corresponding display pixel 820.

The display panel 802 may include a liquid crystal (LC) layer 804, with the display pixels 820 configured to controllably convert or tune a polarization state of the individual sub-beam portions 122, e.g. rotate a linear polarization state. In this embodiment, the light source 801 may be a polarized light source emitting linearly polarized light. A linear polarizer 828 may be provided to convert the polarization distribution of the sub-beam portions 122 imparted by the display pixels 820 into an optical power density distribution representing an image to be displayed. The image is in linear domain, meaning that pixel coordinates of the image being displayed correspond to XY coordinates of the display pixels 820. An ocular lens 830 may be used to convert the image in linear domain into an image in angular domain at an eyebox 826 for direct observation by an eye 880. Herein, the term "image in angular domain" refers to an image where pixel coordinates of the image being displayed correspond to ray angles of the sub-beam portions 122. In embodiments with tunable polarization rotators, the light source 801 may emit polarized light, and the waveguide illuminator 100 may preserve that state of polarization. It is further noted that any of the waveguide illuminators disclosed herein may be used instead of the waveguide illuminator 100 of the display device 800. The waveguide illuminator 100 may be made transparent to external light 814.

Figure 9:
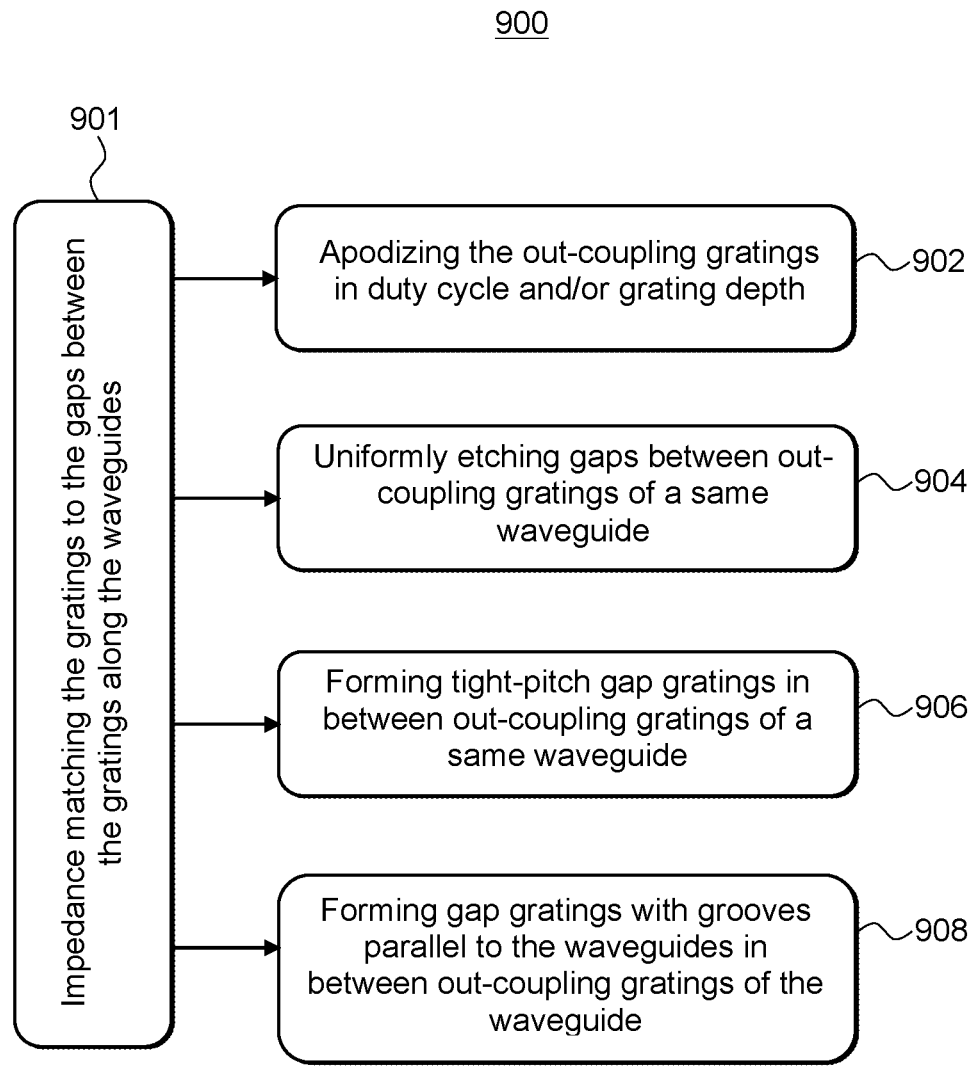
FIG. 9 is a chart diagram of method embodiments for reducing light scattering in a waveguide illuminator in accordance with the present disclosure.

Referring to FIG. 9 with further reference to FIGS. 1 and 3, a method 900 for reducing light scattering in a waveguide illuminator, such as the waveguide illuminator 100 of FIG. 1 or the waveguide illuminator 300 of FIG. 3, includes matching impedance (FIG. 9; 901) of out-coupling gratings e.g. the out-coupling gratings 120 of the row 119 of the out-coupling gratings (FIG. 1) to impedance of gaps between the out-coupling gratings, e.g. the gaps 321 of the row of the out-coupling gratings 320 (FIG. 3), to reduce the optical power of scattered light, e.g. the forward-scattered light 333.

The impedance matching 901 for reduction of the amount of scattered light can be achieved using a number of approaches, which may be used individually or in combination. In one embodiment, matching the impedance of the out-coupling gratings comprises apodizing (902) out-coupling gratings of the array of out-coupling gratings in a direction of length of corresponding waveguides, such that a duty cycle of each out-coupling grating at opposite ends 431, 432 of the out-coupling grating 420A (FIG. 4A) is less than 0.1 or greater than 0.9, being between 0.1 and 0.9 between the opposite ends 431, 432 of the out-coupling grating 420A, and/or an etching depth D of each out-coupling grating 420B at opposite ends 431, 432 of the out-coupling grating 420B is less than in the middle of the coupling grating 420B (FIG. 4B). In embodiments where the waveguide array comprises an array of ridge waveguides, and the array of out-coupling gratings may be formed in the array of ridge waveguides by uniformly etching the ridge waveguides (e.g. the waveguide illuminator 500 of FIG. 5), matching the impedance of the out-coupling gratings may include uniformly etching (FIG. 9; 904) gaps between neighboring out-coupling gratings of each row a gap etch depth $D_{GAP}=a\, D_{GR}$, wherein $0<a<1$ and $D_{GR}$ is the grating etch depth. Matching the impedance may also include forming gap gratings (FIG. 9; 906) in gaps between neighboring out-coupling gratings, e.g. at a pitch at least twice less than a pitch of the out-coupling gratings, as in the waveguide illuminator 600 of FIGS. 6A and 6B having the gap gratings 621 between the out-coupling gratings 620. Matching the impedance may also include forming (FIG. 9; 908) gap gratings with grooves running parallel to the ridge waveguides of the array of ridge waveguides as in e.g. the waveguide illuminator 700 of FIG. 7.

Figure 10:
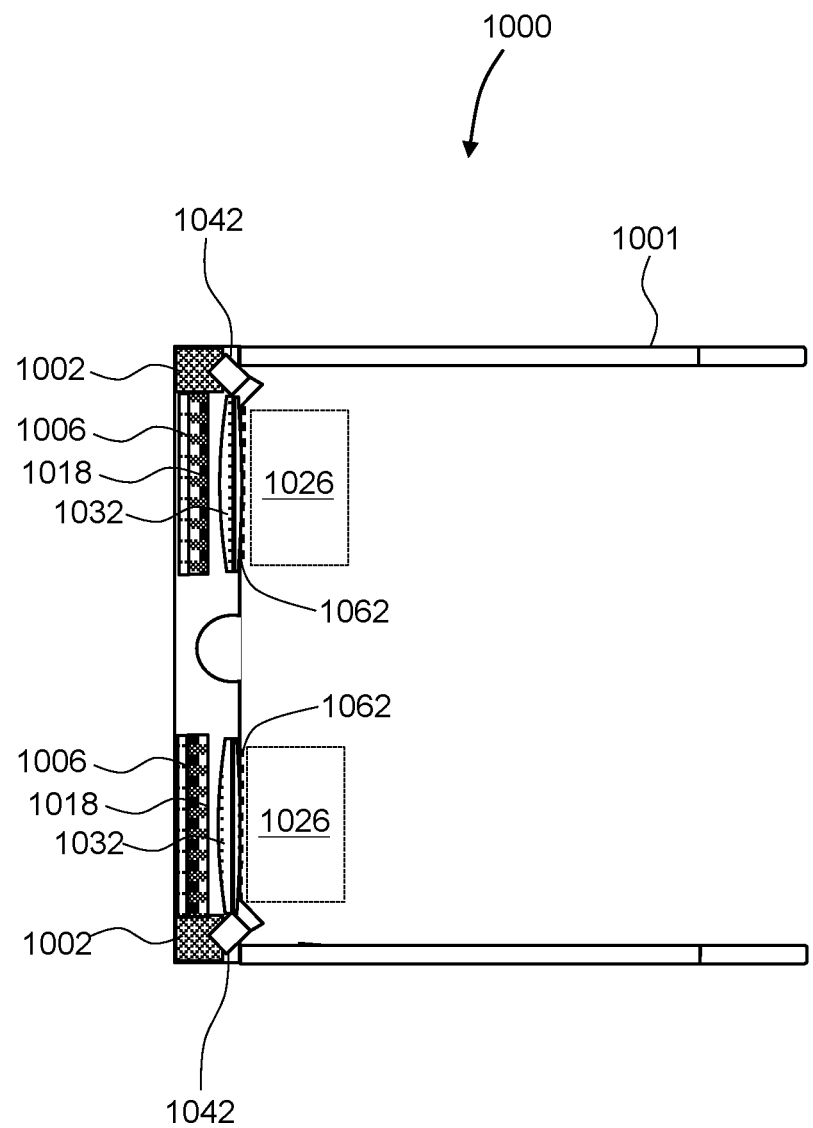
FIG. 10 is a view of an augmented reality (AR) display of this disclosure having a form factor of a pair of eyeglasses.

Turning to FIG. 10, a virtual reality (VR) near-eye display 1000 includes a frame 1001 supporting, for each eye: a light source 1002; a waveguide illuminator 1006 operatively coupled to the light source 1002 and including any of the waveguide illuminators disclosed herein; a display panel 1018 including an array of display pixels, where positions of the out-coupling gratings in the waveguide illuminator 1006 are coordinated with positions of the polarization-tuning pixels of the display panel 1018; and an ocular lens 1032 for converting the image in linear domain generated by the display panel 1018 into an image in angular domain for direct observation at an eyebox 1026. A plurality of eyebox illuminators 1062, shown as black dots, may be placed onto the side of the waveguide illuminator 1006 that faces the eyebox 1026. An eye-tracking camera 1042 may be provided for each eyebox 1026.

The purpose of the eye-tracking cameras 1042 is to determine position and/or orientation of both eyes of the user. The eyebox illuminators 1062 illuminate the eyes at the corresponding eyeboxes 1026, allowing the eye-tracking cameras 1042 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1062, the latter may be made to emit light invisible to the user. For example, infrared light may be used to illuminate the eyeboxes 1026.

Figure 11:
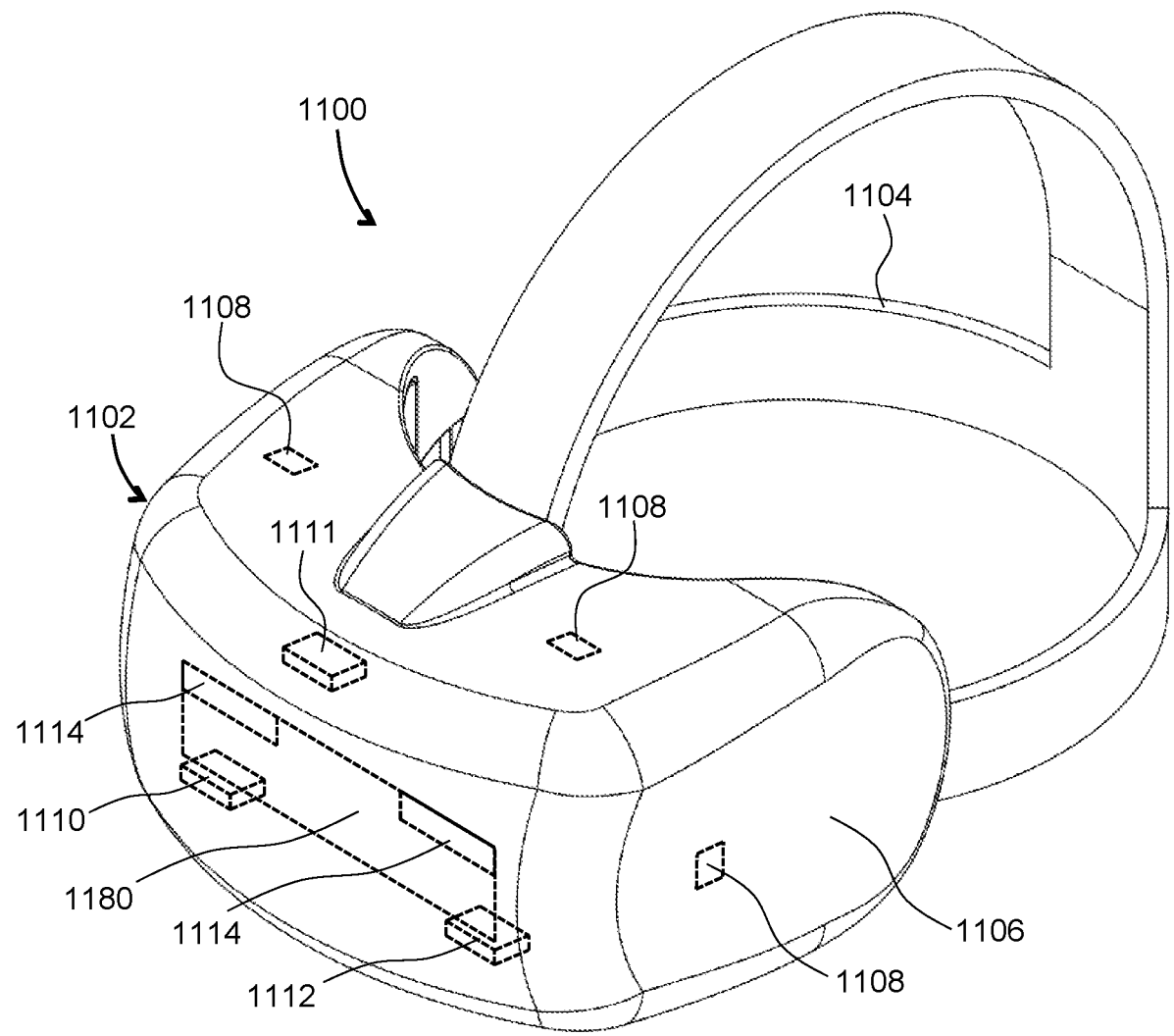
FIG. 11 is a three-dimensional view of a head-mounted display (HMD) of this disclosure.

Referring now to FIG. 11, an HMD 1100 is an example of an AR/VR wearable display system which encloses the user's face, for a greater degree of immersion into the AR/VR environment. The HMD 1100 may generate the entirely virtual 3D imagery. The HMD 1100 may include a front body 1102 and a band 1104 that can be secured around the user's head. The front body 1102 is configured for placement in front of eyes of a user in a reliable and comfortable manner. A display system 1180 may be disposed in the front body 1102 for presenting AR/VR imagery to the user. The display system 1180 may include any of the display devices and illuminators disclosed herein. Sides 1106 of the front body 1102 may be opaque or transparent.

In some embodiments, the front body 1102 includes locators 1108 and an inertial measurement unit (IMU) 1110 for tracking acceleration of the HMD 1100, and position sensors 1112 for tracking position of the HMD 1100. The IMU 1110 is an electronic device that generates data indicating a position of the HMD 1100 based on measurement signals received from one or more of position sensors 1112, which generate one or more measurement signals in response to motion of the HMD 1100. Examples of position sensors 1112 include: one or more accelerometers, one or more gyroscopes, one or more magnetometers, another suitable type of sensor that detects motion, a type of sensor used for error correction of the IMU 1110, or some combination thereof. The position sensors 1112 may be located external to the IMU 1110, internal to the IMU 1110, or some combination thereof.

The locators 1108 are traced by an external imaging device of a virtual reality system, such that the virtual reality system can track the location and orientation of the entire HMD 1100. Information generated by the IMU 1110 and the position sensors 1112 may be compared with the position and orientation obtained by tracking the locators 1108, for improved tracking accuracy of position and orientation of the HMD 1100. Accurate position and orientation is important for presenting appropriate virtual scenery to the user as the latter moves and turns in 3D space.

The HMD 1100 may further include a depth camera assembly (DCA) 1111, which captures data describing depth information of a local area surrounding some or all of the HMD 1100. The depth information may be compared with the information from the IMU 1110, for better accuracy of determination of position and orientation of the HMD 1100 in 3D space.

The HMD 1100 may further include an eye tracking system 1114 for determining orientation and position of user's eyes in real time. The obtained position and orientation of the eyes also allows the HMD 1100 to determine the gaze direction of the user and to adjust the image generated by the display system 1180 accordingly. The determined gaze direction and vergence angle may be used to adjust the display system 1180 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1102.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide illuminator comprising:
   an input waveguide for guiding an input light beam therein;
   a waveguide splitter coupled to the input waveguide for splitting the input light beam into a plurality of sub-beams;
   a waveguide array coupled to the waveguide splitter for propagating the plurality of sub-beams therein, waveguides of the waveguide array running parallel to one another, each waveguide being configured to guide a sub-beam of the plurality of sub-beams; and
   an array of out-coupling gratings comprising rows of spaced apart out-coupling gratings, each row being coupled to a corresponding waveguide of the waveguide array along a length of the waveguide, wherein the out-coupling gratings of each row are configured for out-coupling portions of the sub-beam propagating in the corresponding waveguide, whereby in operation, a two-dimensional array of the sub-beam portions is out-coupled from the waveguide array.

2. The waveguide illuminator of claim 1, wherein the out-coupling gratings of each row of the array out-coupling gratings have an out-coupling efficiency gradually increasing with distance from the waveguide splitter, for flattening a spatial distribution of optical power of the two-dimensional array of the out-coupled sub-beam portions.

3. The waveguide illuminator of claim 1, wherein out-coupling gratings of the array of out-coupling gratings are apodized in a direction of length of corresponding waveguides, such that at least one of:
   a duty cycle of each out-coupling grating is less than 0.1 or greater than 0.9 at opposite ends of the out-coupling grating, and is greater than 0.1 and less than 0.9 between the opposite ends of the out-coupling grating; or
   a groove depth of each out-coupling grating is less at the opposite ends of the out-coupling grating than at the middle of the out-coupling grating.

4. The waveguide illuminator of claim 1, wherein:
   the waveguide array comprises an array of ridge waveguides;
   the array of out-coupling gratings is formed in the array of ridge waveguides;
   the out-coupling gratings of each row comprise grooves etched in a corresponding ridge waveguide of the array of ridge waveguides to a grating etch depth $D_{GR}$; and
   gaps between neighboring out-coupling gratings of each row are uniformly etched to a gap etch depth $D_{GAP}=aD_{GR}$, wherein $0<a<1$.

5. The waveguide illuminator of claim 4, wherein $a<0.5$.

6. The waveguide illuminator of claim 1, wherein:
   the waveguide array comprises an array of ridge waveguides;
   the array of out-coupling gratings is formed in the array of ridge waveguides;
   the out-coupling gratings of each row comprise grooves in a corresponding ridge waveguide of the array of ridge waveguides at a grating pitch $P_{GR}$; and
   gaps between neighboring out-coupling gratings of each row comprise gap gratings.

7. The waveguide illuminator of claim 6, wherein the gap gratings comprise grooves running non-parallel to the waveguides of the waveguide array at a gap pitch $P_{GAP}=bP_{GR}$, wherein $0<b<0.5$.

8. The waveguide illuminator of claim 6, wherein the gap gratings comprise grooves running parallel to the waveguides of the waveguide array.

9. A display device comprising:
   a waveguide illuminator comprising:
      an input waveguide for guiding an input light beam therein;
      a waveguide splitter coupled to the input waveguide for splitting the input light beam into a plurality of sub-beams;
      a waveguide array coupled to the waveguide splitter for propagating the plurality of sub-beams therein, waveguides of the waveguide array running parallel to one another, each waveguide being configured to guide a sub-beam of the plurality of sub-beams; and
      an array of out-coupling gratings comprising rows of spaced apart out-coupling gratings, each row being coupled to a corresponding waveguide of the waveguide array along a length of the waveguide, wherein the out-coupling gratings of each row are configured for out-coupling portions of the sub-beam propagating in the corresponding waveguide, whereby in operation, a two-dimensional array of the sub-beam portions is out-coupled from the waveguide array; and
   a display panel comprising an array of display pixels disposed and configured to receive the two-dimensional array of the out-coupled sub-beam portions.

10. The display device of claim 9, wherein the out-coupling gratings of each row of the array out-coupling gratings have an out-coupling efficiency gradually increasing with distance from the waveguide splitter, for flattening a spatial distribution of optical power of the two-dimensional array of the out-coupled sub-beam portions.

11. The display device of claim 9, wherein out-coupling gratings of the array of out-coupling gratings are apodized in a direction of length of waveguides of the waveguide array to reduce light scattering by the array of out-coupling gratings.

12. The display device of claim 9, wherein a pitch of the display pixels is substantially equal to a pitch of the array of out-coupling gratings.

13. The display device of claim 9, further comprising a light source for providing the input light beam to the input waveguide.

14. The display device of claim 13, wherein the light source is a polarized light source, wherein the input light beam and the out-coupled sub-beam portions are polarized; and
wherein the array of display pixels comprises an array of tunable polarization rotators for tuning polarization of individual sub-beam portions.

15. The display device of claim 13, wherein the light source comprises a monochromatic light source, wherein the input light beam has a wavelength of a first color channel.

16. A method for reducing light scattering in a waveguide illuminator comprising a waveguide splitter for splitting an input light beam into a plurality of sub-beams, a waveguide array coupled to the waveguide splitter for propagating the plurality of sub-beams therein, each waveguide being configured to guide a sub-beam of the plurality of sub-beams, and an array of out-coupling gratings comprising rows of spaced apart out-coupling gratings formed in corresponding waveguides for out-coupling portions of the sub-beams propagating in the corresponding waveguides, the method comprising:

matching impedance of out-coupling gratings of a row of the out-coupling gratings to impedance of gaps between the out-coupling gratings of the row of the out-coupling gratings.

17. The method of claim 16, wherein matching the impedance of the out-coupling gratings comprises apodizing out-coupling gratings of the array of out-coupling gratings in a direction of length of corresponding waveguides, such that a duty cycle of each out-coupling grating at opposite ends of the out-coupling grating is less than 0.1 or greater than 0.9, being between 0.1 and 0.9 between the opposite ends of the out-coupling grating.

18. The method of claim 16, wherein the waveguide array comprises an array of ridge waveguides, and the array of out-coupling gratings is formed in the array of ridge waveguides by etching the ridge waveguides to a grating etch depth $D_{GR}$; and
wherein matching impedance of the out-coupling gratings comprises uniformly etching gaps between neighboring out-coupling gratings of each row a gap etch depth $D_{GAP}=a\ D_{GR}$, wherein $0<a<1$.

19. The method of claim 16, wherein the waveguide array comprises an array of ridge waveguides, and the array of out-coupling gratings is formed in the array of ridge waveguides; and
wherein matching impedance of the out-coupling gratings comprises forming gap gratings in gaps between neighboring out-coupling gratings, at a pitch at least twice less than a pitch of the out-coupling gratings.

20. The method of claim 16, wherein the waveguide array comprises an array of ridge waveguides, and the array of out-coupling gratings is formed in the array of ridge waveguides; and
wherein matching impedance of the out-coupling gratings comprises forming gap gratings in gaps between neighboring out-coupling gratings, the gap gratings comprising grooves running parallel to the ridge waveguides of the array of ridge waveguides.

* * * * *